(12) United States Patent
Mizobuchi

(10) Patent No.: US 11,144,724 B2
(45) Date of Patent: Oct. 12, 2021

(54) CLUSTERING OF WORDS WITH MULTIPLE MEANINGS BASED ON GENERATING VECTORS FOR EACH MEANING

(71) Applicant: FUJITSU LIMITED, Kawasaki (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 16/290,659

(22) Filed: Mar. 1, 2019

(65) Prior Publication Data

US 2019/0286703 A1 Sep. 19, 2019

(30) Foreign Application Priority Data

Mar. 14, 2018 (JP) .............................. JP2018-046864

(51) Int. Cl.
*G06F 40/279* (2020.01)
*G06F 40/30* (2020.01)
*G06N 20/00* (2019.01)

(52) U.S. Cl.
CPC .................................... *G06F 40/30* (2020.01)

(58) Field of Classification Search
CPC .... G06F 40/237; G06F 40/247; G06F 40/279; G06F 40/284; G06F 40/30; G06N 20/00
USPC ................. 704/1, 9, 10; 706/20, 55
See application file for complete search history.

(56) References Cited

U.S. PATENT DOCUMENTS

| | | | | |
|---|---|---|---|---|
| 6,134,532 | A * | 10/2000 | Lazarus | G06F 16/9535 705/14.25 |
| 6,256,629 | B1 * | 7/2001 | Sproat | G06F 40/289 |
| 8,694,565 | B2 * | 4/2014 | Beckman | G06F 16/2448 708/200 |
| 2006/0036640 | A1 * | 2/2006 | Tateno | G06F 16/907 |
| 2009/0157648 | A1 * | 6/2009 | King | G06F 40/284 |
| 2012/0278332 | A1 * | 11/2012 | Wang | G06F 40/284 707/740 |
| 2013/0006636 | A1 | 1/2013 | Mizuguchi et al. | |
| 2013/0085745 | A1 * | 4/2013 | Koister | G06F 40/30 704/9 |
| 2013/0124536 | A1 * | 5/2013 | Miyahara | G06F 16/9535 707/748 |
| 2015/0160098 | A1 * | 6/2015 | Noda | G05B 23/024 702/35 |
| 2016/0292145 | A1 * | 10/2016 | Azzi | G06F 40/30 |

(Continued)

FOREIGN PATENT DOCUMENTS

| | | |
|---|---|---|
| JP | 2001-331515 | 11/2001 |
| JP | 2013-020431 | 1/2013 |
| WO | 2011/118723 | 9/2011 |

OTHER PUBLICATIONS

Qin et al., "Cluster Correction on Polysemy and Synonymy", 2017 14th Web Information Systems and Applications Conference (WISA), Nov. 11-12, 2017, pp. 136 to 138. (Year: 2017).*

(Continued)

*Primary Examiner* — Martin Lerner
(74) *Attorney, Agent, or Firm* — Fujitsu Patent Center

(57) ABSTRACT

A clustering method, clustering program, and clustering device are described herein for clustering of words with multiple meanings based on generating vectors for each meaning of a word. The generated vectors provide a distributed representation of a word in a vector space that account for the multiple meanings of the word so as, for instance, to learn semantic representations with high accuracy.

7 Claims, 9 Drawing Sheets

(56) References Cited

U.S. PATENT DOCUMENTS

| | | | | |
|---|---|---|---|---|
| 2017/0109648 | A1* | 4/2017 | Shmueli | G06N 20/00 |
| 2017/0169011 | A1* | 6/2017 | Shmueli | G06F 40/30 |
| 2017/0308613 | A1* | 10/2017 | Zhu | G06N 20/00 |
| 2018/0121444 | A1* | 5/2018 | Bao | G06F 40/242 |
| 2018/0285344 | A1* | 10/2018 | He | G06F 40/30 |
| 2018/0285347 | A1* | 10/2018 | Mizobuchi | G06F 40/284 |
| 2018/0357216 | A1* | 12/2018 | Bakis | G06F 40/30 |
| 2019/0171792 | A1* | 6/2019 | Manica | G06F 40/20 |

OTHER PUBLICATIONS

Guo et al., "Polyseme-Aware Vector Representation for Text Classification", IEEE Access: vol. 8, Jul. 21, 2020, pp. 135686 to 135699. (Year: 2020).*

* cited by examiner

FIG. 4

```
s1 : I cut an apple on the table.
s2 : I used an apple on the table.
s3 : I invested AAPL.
...
```

FIG. 5

```
DICTIONARY:
    dic = {w1: I, w2: cut, w3: an, w4: apple, w5: on,
    w6: the, w7: table, w8: use, w9: invest, w10: AAPL, ...}
CORRESPONDENCE TABLE:
    word_sentence = {w1: [s1, s2, s3, s4], w2: [s1], ...}
```

- INITIAL w1 VECTOR
    initial_h_w1 = (0.13, -0.64, 1.55)

- LEARNED w1 VECTOR
    learned_h_w1_s1: (0.24, -1.56, 3.77)

MOTION VECTOR OF w1 MOVED BY s1
    diff_h_w1_s1 = learned_h_w1_s1 −
    initial_h_w1 = (0.11, -0.92, 2.22)

diff_h_w1 = {s1: (0.11, -0.92, 2.22), s2: (0.21, -1.32, 3.22), s3: (0.19, -3.92, 1.22), s4: (0.12, -0.93, 2.23)} diff_h_w1 = {s1: (0.11, -0.92, 2.22), s2: (0.21, -1.32, 3.22), s3: (0.19, -3.92, 1.22), s4: (0.12, -0.93, 2.23)} cluster_h_w1 = {cluster1: (s1, s2, s3, s4)} cluster_h_w4 = {cluster1: (s1, s10, s103), cluster2: (s2, s3, s36, s58)}

CLUSTERING OF WORDS WITH MULTIPLE MEANINGS BASED ON GENERATING VECTORS FOR EACH MEANING

CROSS-REFERENCE TO RELATED APPLICATION

This application is based upon and claims the benefit of priority of the prior Japanese Patent Application No. 2018-46864, filed on Mar. 14, 2018, the entire contents of which are incorporated herein by reference.

FIELD

The embodiments discussed herein are related to a clustering program, a clustering method, and a clustering device for generating a distributed representation of words.

BACKGROUND

In the related art, because the way in which to represent the meaning of a word is important for achieving document processing, "Bag-of-Words" that accounts for the semantic distance, or "Distributed Representation" that realizes a one-hot representation, or the like, is being used. In recent years, distributed representations that express semantic relationships between words as a vector are being used, and publicly available technologies that perform a distributed representation of words include Word2Vec, which is a mechanism that achieves both word co-occurrence relations and dimensional compression at the same time, the Skip-gram model that accepts a word appearing in a sentence as input and predicts surrounding words, and the like. For example, see Japanese Laid-open Patent Publication No. 2001-331515, International Publication Pamphlet No. 2011/118723, and Japanese Laid-open Patent Application Publication No. 2013-020431.

However, with the above technology, accuracy is poor for a distributed representation of a word with multiple meanings. For example, a technology such as Word2Vec is a distributed representation related to the surface layer, that is, the written expression of a word that does not consider the meaning of the word, and thus for words with multiple meanings, a distributed representation that does not consider the various meanings of the word is obtained. On the other hand, a distributed representation may be obtained by accounting for the multiple meanings of a word, distinguishing the meanings by changing the written expression of the word with multiple meanings, and performing learning. However, determining how to proceed with separating out the multiple meanings of a word is difficult.

SUMMARY

According to an aspect of the embodiments, a clustering method for generating a distributed representation of a word in a vector space, the method includes: recording, before a learning of multiple words, a first vector value in the vector space for each of the multiple words; recording, after the learning, a second vector value in the vector space for each of the multiple words; clustering the multiple words based on a change between the first vector value and the second vector value; and generating vectors separated for each meaning with respect to a word with multiple meanings included among the multiple words, based on a result of the clustering.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of information stored in a sentence DB;

FIG. 5 is a diagram illustrating an example of a generated dictionary and correspondence table;

DESCRIPTION OF EMBODIMENTS

Hereinafter, examples of a clustering program, a clustering method, and a clustering device disclosed in this specification will be described in detail based on the drawings. However, the embodiments are not limited to these examples. Furthermore, each of the examples described hereinafter may also be combined as appropriate, to the extent that such combinations are not contradictory.

EXAMPLE 1

[Description of Clustering Device]

Figure 1:
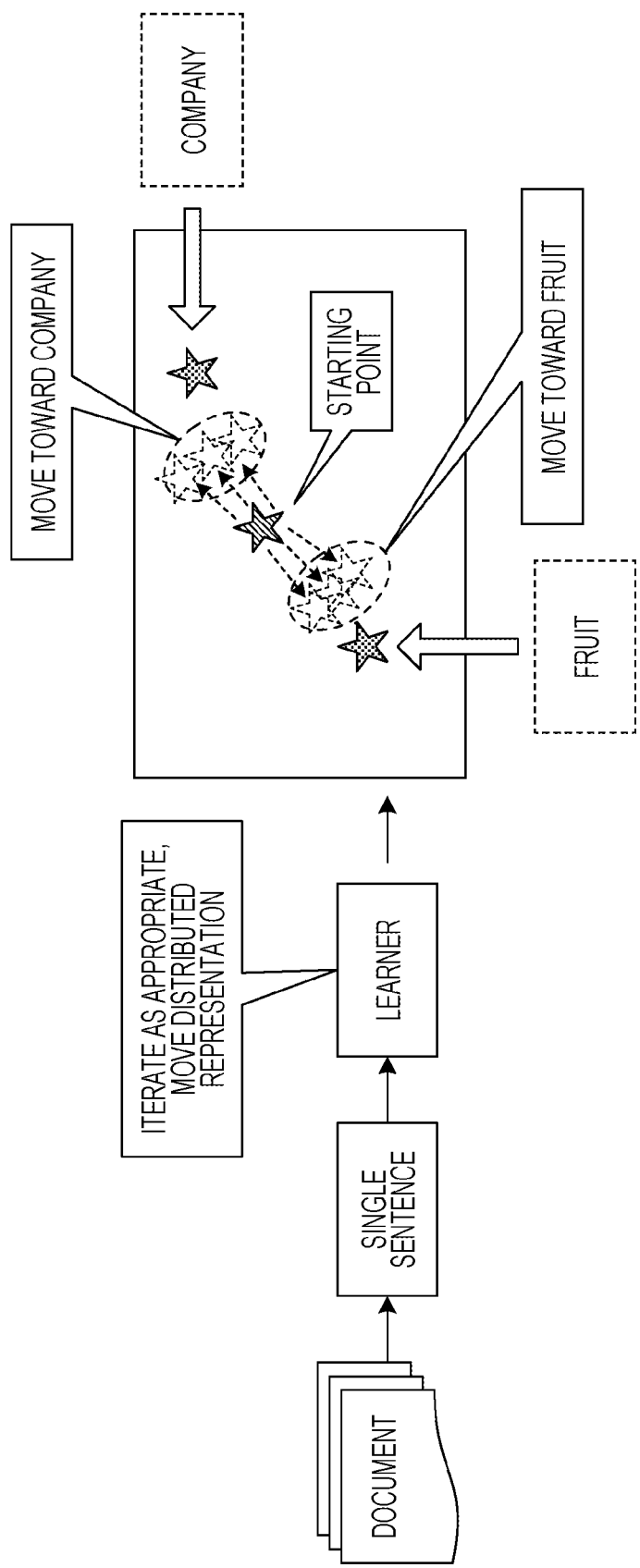
FIG. 1 is a diagram explaining a clustering device according to Example 1.

FIG. 1 is a diagram explaining a clustering device according to Example 1. As illustrated in FIG. 1, the clustering device is one example of a computer apparatus that extracts words from sentences including a word with multiple meanings, and over the course of learning a distributed representation of the words using each sentence, clusters motion vectors of the distributed representation.

In the clustering of context (Bag-of-Words for words occurring together) that accounts for the multiple meanings of words, since clustering is performed without accounting for the similarity of words, the accuracy of distinguishing the multiple meanings is not high. For example, a method of performing clustering that accounts for the multiple meanings and oneness of a word to rewrite the surface layer itself of the word is conceivable, but since the distance (difference) between different words does not account for similarity, the distances between warm and hot, hot and cold, and the like become uniform. On the other hand, to account for the similarity of words, it is also conceivable to first use Word2Vec or a singular value decomposition to obtain a distributed representation, and then execute a clustering of context, but with this method, the obtained distributed representation does not account for multiple meanings of the same word.

In this way, it is desirable to perform context clustering while accounting for multiple meanings and similarity at the same time. Accordingly, the clustering device according to Example 1 executes the following process for each word. The clustering device decides a starting point in the space of the distributed representation, and uses an initial state to set the parameters of the learner. After that, the clustering device learns each word for each input sentence, computes a motion vector from the difference in the distributed representation before and after learning, and clusters the motion vectors.

For example, the clustering device iterates as appropriate, and moves the distributed representation from the starting point. At this point, in the case in which a word A has the two meanings of a fruit and a company, the clustering device learns while moving in the two directions of fruit and company over the course of learning. In other words, for example, the clustering device accounts for similarity by using a dimensionally-compressed vector space in the course of learning the distributed representation, and accounts for multiple meanings by focusing on the direction in which to move over the course of the learning. As a result, the clustering device is able to improve the accuracy of a distributed representation of a word with multiple meanings.

Figure 2:
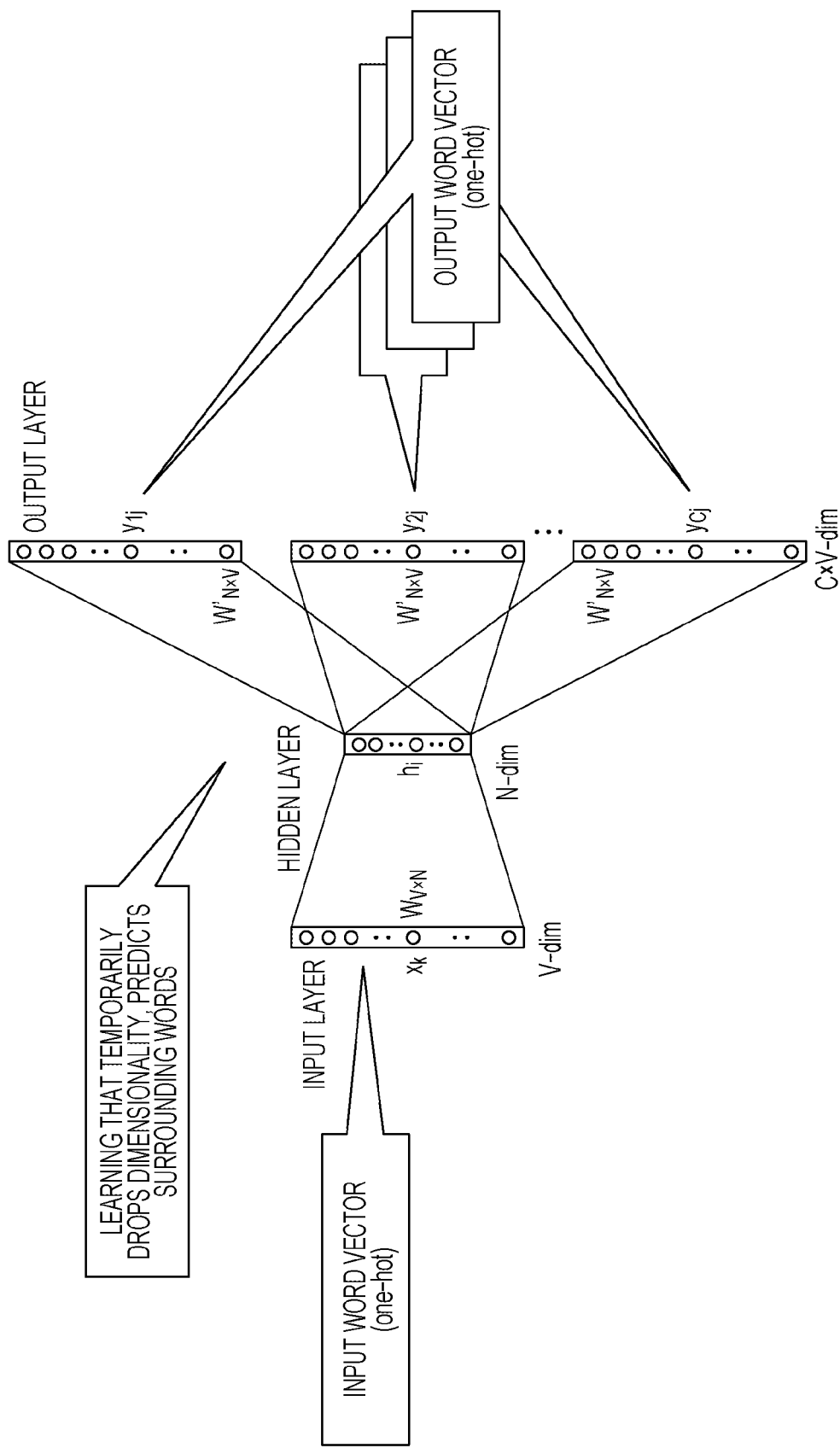
FIG. 2 is a diagram explaining a learning method according to Example 1.

Next, one example of a learning technique executed by the clustering device will be described. The clustering device is able to adopt any of various publicly available learning techniques, such as Word2Vec, but Example 1 will describe an example of using the Skip-gram model, which is a learning model that accepts a word appearing in a sentence as input and predicts surrounding words. FIG. 2 is a diagram explaining a clustering technique according to Example 1. As illustrated in FIG. 2, the learner of the clustering device inputs a V-dimensional one-hot vector into an input layer, and after mapping to an N-dimensional (N<V) hidden layer, outputs word vectors of C words (each V-dimensional) from an output layer.

At this point, if the output is different from the expected output vectors, the learner performs parameter fitting using a technique such as back-propagation to learn the differences. Subsequently, the largest element from among the output V-dimensional vector of each word is treated as the predicted word, learning of the weights (W) proceeds to make up the difference from the word one actually wants to predict, and the vector of the hidden layer obtained over the course of learning becomes the distributed representation corresponding to the input vector. Note that $x_k$ illustrated in FIG. 2 is the input vector, and the like are the output vectors, $W_{V \times N}$ is the weights from the input layer to the hidden layer, and $W'_{N \times V}$ is the weights from the hidden layer to the output layer.

[Functional Configuration]

Figure 3:
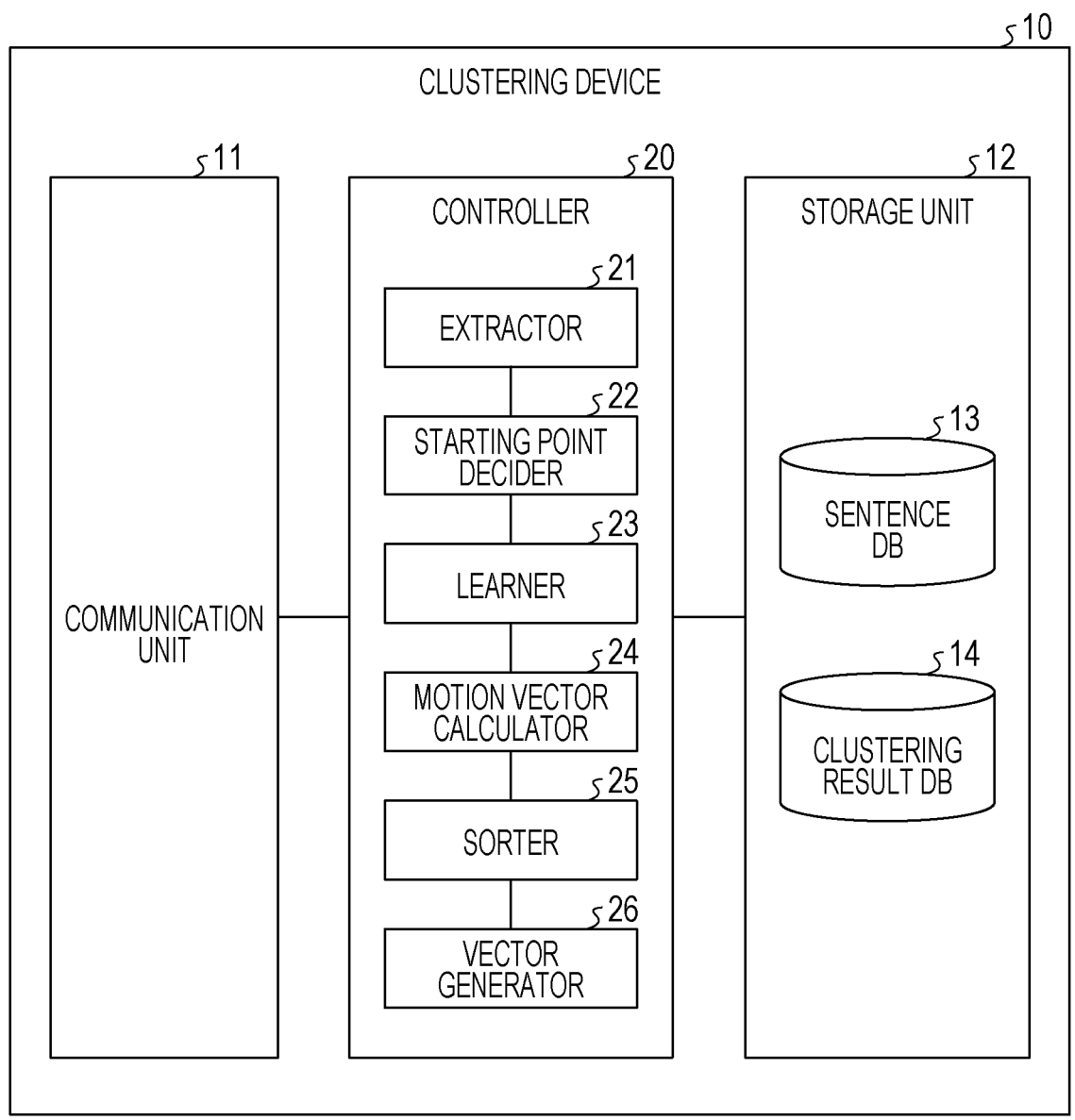
FIG. 3 is a function block diagram illustrating a functional configuration of the clustering device according to Example 1.

FIG. 3 is a function block diagram illustrating a functional configuration of the a clustering device 10 according to Example 1. As illustrated in FIG. 3, the clustering device 10 includes a communication unit 11, a storage unit 12, and a controller 20.

The communication unit 11 is a processing unit that controls communication with another device, and is a communication interface or the like, for example. For example, the communication unit 11 receives an instruction to start a process, sentence data, and the like from an administrator terminal, and transmits a clustering result and the like to a specified terminal.

The storage unit 12 is one example of a storage device that stores programs and data, and is memory, a hard disk, and the like, for example. The storage unit 12 stores a sentence DB 13 and a clustering result DB 14.

The sentence DB 13 is a database that stores sentences used for learning. Specifically, the sentence DB 13 stores multiple sentences containing multiple words, including words with multiple meanings. FIG. 4 is a diagram illustrating an example of information stored in the sentence DB 13. As illustrated in FIG. 4, the sentence DB 13 stores multiple sentences, to each of which is assigned a sentence ID. The example of FIG. 4 illustrates that the sentence with the sentence ID "s1" is "I cut an apple on the table."

The clustering result DB 14 is a database that stores clustering results. Specifically, the clustering result DB 14 stores sentence clusters generated by the controller 20 described later. Note that since details will be described later, a description is omitted here.

The controller 20 is a processing unit that oversees the clustering device 10 as a whole, and is a processor or the like, for example. The control unit 20 includes an extractor 21, a starting point decider 22, a learner 23, a motion vector calculator 24, a sorter 25, and a vector generator 26. Note that the extractor 21, the starting point decider 22, the learner 23, the motion vector calculator 24, the sorter 25, and the vector generator 26 are one example of electronic circuits included in the processor or processes executed by the processor. Note that the starting point decider 22 is one example of a first recording unit, the learner 23 is one example of a second recording unit, the motion vector calculator 24 and the sorter 25 are one example of a sorting unit, and the vector generator 26 is one example of a generation unit.

The extractor 21 is a processing unit that extracts words from each sentence stored in the sentence DB 13, and generates a dictionary of words and a list of sentences including each word. When described in terms of the example illustrated in FIG. 4, the extractor 21 extracts words by reading out each sentence and executing morphological analysis. At this time, in the case of English sentences or the like, the extractor 21 normalizes conjugations such as past tense for extraction. Next, the extractor 21 starts referencing from the beginning of the sentence s1, extracts the words, and assigns an identifier (word ID) to the words in order of appearance.

In the example of FIG. 4, first, the extractor 21 extracts "I" from a sentence s1 in a document and assigns the word ID "w1", then extracts "cut" from s1 and assigns the word ID "w2", extracts "an" from s1 and assigns the word ID "w3", extracts "apple" from s1 and assigns the word ID "w4", extracts "on" from s1 and assigns the word ID "w5", extracts "the" from s1 and assigns the word ID "w6", and extracts "table" from s1 and assigns the word ID "w7". Next, the extractor 21 reads out "I" at the beginning of sentence s2 in the document, but since the word has been extracted already, the extractor 21 skips "I", then extracts "use" from s2 and assigns the word ID "w8".

In this way, the extractor 21 generates a dictionary by extracting the words from each sentence while also skipping the extraction of duplicate words in each sentence. After that, the extractor 21 generates a list of sentences including each word. For example, since the word "I" with the word ID "w1" is included in each of the sentences s1, s2, and s3, the extractor 21 associates "w1" with "s1, s2, s3", and since the word "cut" with the word ID "w2" is included in only the sentence s1, the extractor 21 associates "w2" with "s1".

A dictionary and associations generated by the technique described above is illustrated in FIG. 5. FIG. 5 is a diagram illustrating an example of a generated dictionary and correspondence table. As illustrated in FIG. 5, the extractor 21 generates "dic={w1:I, w2:cut, w3:an, . . . }" or the like as a dictionary dic of words extracted from each sentence. Also, the extractor 21 generates {w1:[s1, s2, s3, s4], w2: [s2], . . . } as a correspondence table word_sentence between each word and the sentences. Subsequently, the extractor 21 outputs the dictionary dic and the correspondence table word_sentence to another processing unit such as the starting point decider 22.

The starting point decider 22 is a processing unit that decides or assigns, for each word, a starting point in the vector space when generating a motion vector indicating how the vector value changes before and after learning. Specifically, the starting point decider 22 decides the starting point to act as the learning initial value for each of the words w1, w2, w3, and so on in the dictionary dic generated by the extractor 21.

For example, in the case of setting the dimensionality to 3, the starting point decider 22 treats a vector whose elements are all 0, that is, a zero vector, as the starting point, and sets $W_{V \times N}$ and $W'_{N \times V}$ accordingly. Specifically, the starting point decider 22 sets initial_h_w1=(0.0, 0.0, 0.0) as the starting point, sets parameters such that the product of multiplying $W_{V \times N}$ by the input vector x of w1 becomes initial_h_w1, and sets parameters such that the product of multiplying $W'_{N \times V}$ by the input vector from the hidden layer becomes initial_h_w1.

As a different technique, the starting point decider 22 may also set a randomly generated vector as the starting point, and set $W_{V \times N}$ and $W'_{N \times V}$ accordingly. For example, the starting point decider 22 sets the randomly selected initial_h_w1=(0.13, −0.64, 1.55) as the starting point, sets parameters such that the product of multiplying $W_{V \times N}$ by the input vector x of w1 becomes initial_h_w1, and sets parameters such that the product of multiplying $W'_{N \times V}$ by the input vector from the hidden layer becomes initial_h_w1. Also, as a different technique, the starting point decider 22 may also set a vector learned with Word2Vec as the starting point, and set $W_{V \times N}$ and $W'_{N \times V}$ accordingly.

In this way, the starting point decider 22 decides a starting point and weights for each word, and outputs to the learner 23. Note that Example 1 describes an example in which the randomly generated initial_h_w1=(0.13, −0.64, 1.55) is set as the starting point for the word w1.

The learner 23 is a processing unit that, for each word, uses sentences that include the word to move the distributed representation of the word. In other words, for example, the learner 23 uses Skip-gram to learn a predetermined number of times, treating the starting point decided by the starting point decider 22, the y-vector of a Skip-gram generated from a sentence, and the x-vector of a Skip-gram generated from a sentence as inputs. In the above example, the learner 23 uses Skip-gram to move the distributed representation of the word w1 by treating the sentence s1 as input.

For example, in the case of using the sentence s1 to learn the word w1, the learner 23 treats the starting point "initial_h_w1=(0.13, −0.64, 1.55)", the Skip-gram y-vector "y_w1=(0, 1, 1, 1, 1, 1, 1, 0, . . . )", and the Skip-gram x-vector "x_w1=(1, 0, 0, 0, . . . )" as inputs, executes learning using the Skip-gram three times, and acquires a learned vector "learned_h_wLs1: (0.24, −1.56, 3.77)" for the word w1. Additionally, the learner 23 outputs the starting point "initial_h_w1=(0.13, −0.64, 1.55)" and the learned result "learned_h_w1_s1: (0.24, −1.56, 3.77)" to the motion vector calculator 24 as the result of learning the word w1 by the sentence s1.

In this way, the learner 23 learns each word by each sentence including the word, acquires the vectors before and after learning, and outputs to the motion vector calculator 24. For example, when described by taking the correspondence table of FIG. 5 as an example, for the word w1, the learner 23 learns by each of the sentences s1, s2, s3, and so on to acquire a distributed representation h, while for the word w2, the learner 23 learns by only the sentence s1 to acquire a distributed representation h.

Figures 6, 7:
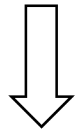
FIG. 6 is a diagram explaining an example of computing a motion vector by s1 of w1.
FIG. 7 is a diagram explaining a motion vector of w1 computed from each sentence.

The motion vector calculator 24 is a processing unit that, for each word, computes from the starting point vector and the learned vector the difference in the distributed representation before and after learning, that is, a motion vector. FIG. 6 is a diagram explaining an example of computing a motion vector by s1 of w1. The motion vector calculator 24 computes the difference "0.11, −0.92, 2.22" between the word w1 starting point vector "initial_h_w1=(0.13, −0.64, 1.55)" and the word w1 learned vector "learned_h_w1_s1: (0.24, −1.56, 3.77)" as the motion vector "diff h_w1_s1" by the sentence s1 of the word w1, and outputs to the sorter 25.

In this way, for each word, the motion vector calculator 24 computes each motion vector by each sentence after executing learning using each sentence including the word. A description will be given using the above word w1 as an example. FIG. 7 is a diagram explaining a motion vector of w1 computed from each sentence. Since the word w1 is included in each of the sentences s1, s2, s3, and s4, learning is performed by treating each of the sentences s1, s2, s3, and s4 as inputs, and a motion vector is computed with respect to each of the sentences s1, s2, s3, and s4. For this reason, as illustrated in FIG. 7, the set "diff_h_w1" of motion vectors of the word w1 includes the motion vector [s1: (0.11, −0.92, 2.22)] using the sentence s1, the motion vector [s2: (0.21, −1.32, 3.22)] using the sentence s2, the motion vector [s3: (0.19, −3.92, 1.22)] using the sentence s3, and the motion vector [s4: (0.12, −0.93, 2.23)] using the sentence s4.

The sorter 25 is a processing unit that clusters multiple words based on how the vector values change before and after the learning of the multiple words. Specifically, the sorter 25 uses publicly available clustering technology to compute the distance between the motion vectors of each word computed by the motion vector calculator 24, and sorts motion vectors at a close distance for which the distance is equal to or less than a threshold value into the same cluster.

Figures 8A, 8B:
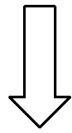
FIGS. 8A and 8B are diagrams explaining clustering results.

FIGS. 8A and 8B are diagrams explaining clustering results. FIG. 8A illustrates an example in which the set "diff_h_w1={s1: (0.11, −0.92, 2.22)}, {s2: (0.21, −1.32, 3.22)}, {s3: (0.19, −3.92, 1.22)}, and {s4: (0.12, −0.93, 2.23)}" of motion vectors of the word w1 are input, and distances between each of the motion vectors are a threshold value or less. In this case, the sorter 25 sorts each of the motion vectors into the same cluster, and generates "cluster_h_w1={cluster1: (s1, s2, s3, s4)}".

In this example, since the word w1 is sorted into a single cluster, the sorter 25 estimates that there is a single meaning. Additionally, the sorter 25 assigns the same word label to the word w1 that appears in each of the sentences s1, s2, s3, and s4. For example, in the case in which the word w1 is "I", the sorter 25 assigns the word label "w1_1" or the like to "I" appearing in each of the sentences s1, s2, s3, and s4. To give an example, for "s1: I cut an apple on the table", a word label is assigned like "s1: I_1 cut an apple on the table".

Also, FIG. 8B illustrates the clustering result "cluster_h_w4={cluster1: (s1, s10, s103)}, {cluster2: (s2, s3, s36, s58)}" of the word w4. In this example, since the word w4 is sorted into two clusters, the sorter 25 estimates that there are two meanings. Additionally, the sorter 25 assigns the same word label to the word w4 appearing in each of the sentences s1, s10, and s103 of cluster 1, and assigns a word label different from cluster 1 to the word w4 appearing in each of the sentences s2, s3, s36, and s58 of cluster 2. For example, in the case in which the word w4 is "cut", the sorter 25 assigns the word label "w4_1" or the like to "cut" appearing in each of the sentences s1, s10, and s103, and assigns the word label "w4_2" or the like to "cut" appearing in each of the sentences s2, s3, s36, and s58.

To give an example, for "s1: I_1 cut an apple on the table" in s1 of the above cluster 1, a word label is assigned like "s1: I_1 cut_1 an apple on the table", while for "s3: MA Company cut 3000 employees" of cluster 2, a word label is assigned like "s3: AAA Company cut_2 3000 employees."

The vector generator 26 is a processing unit that generates vectors separated for each meaning with respect to words with multiple meanings included among the multiple words, based on the clustering result. For example, the vector generator 26 is also able to decide the range of a cluster according to the multiple motion vectors included in the cluster. When described in terms of the above example, in the case in which "cluster_h_w1={cluster1: (s1, s2, s3, s4)}" is decided, the vector generator 26 is able to decide the range enclosed by each of the motion vectors in the set "diff_h_w1={s1: (0.11, −0.92, 2.22)}, {s2: (0.21, −1.32, 3.22)}, {s3: (0.19, −3.92, 1.22)}, and {s4: (0.12, −0.93, 2.23)}" of elements of the cluster as the range of meaning of the word w1.

In addition, the vector generator 26 is also able to compute a center of gravity from the multiple motion vectors included in a cluster, and decide that a vector corresponding to the center of gravity is an average vector of the meaning of the word. When described in terms of the above example, in the case in which "cluster_h_w4={cluster1: (s1, s10, s103)}, {cluster2: (s2, s3, s36, s58)}" is decided, the vector generator 26 is able to compute the center of gravity of each of the motion vectors in the set of elements in the cluster 1 and determine the center of gravity to be a reference value for a first meaning of the word w4, while in addition, compute the center of gravity of each of the motion vectors in the set of elements in the cluster 2 and determine the center of gravity to be a reference value for a second meaning of the word w4.

Note that labeled sentences may also be used to learn a distributed representation accounting for the similarity and multiple meanings of words. Additionally, each vector generated by the vector generator 26 may also be used to learn a distributed representation of words with multiple meanings or the like.

[Process Flow]

Figure 9:
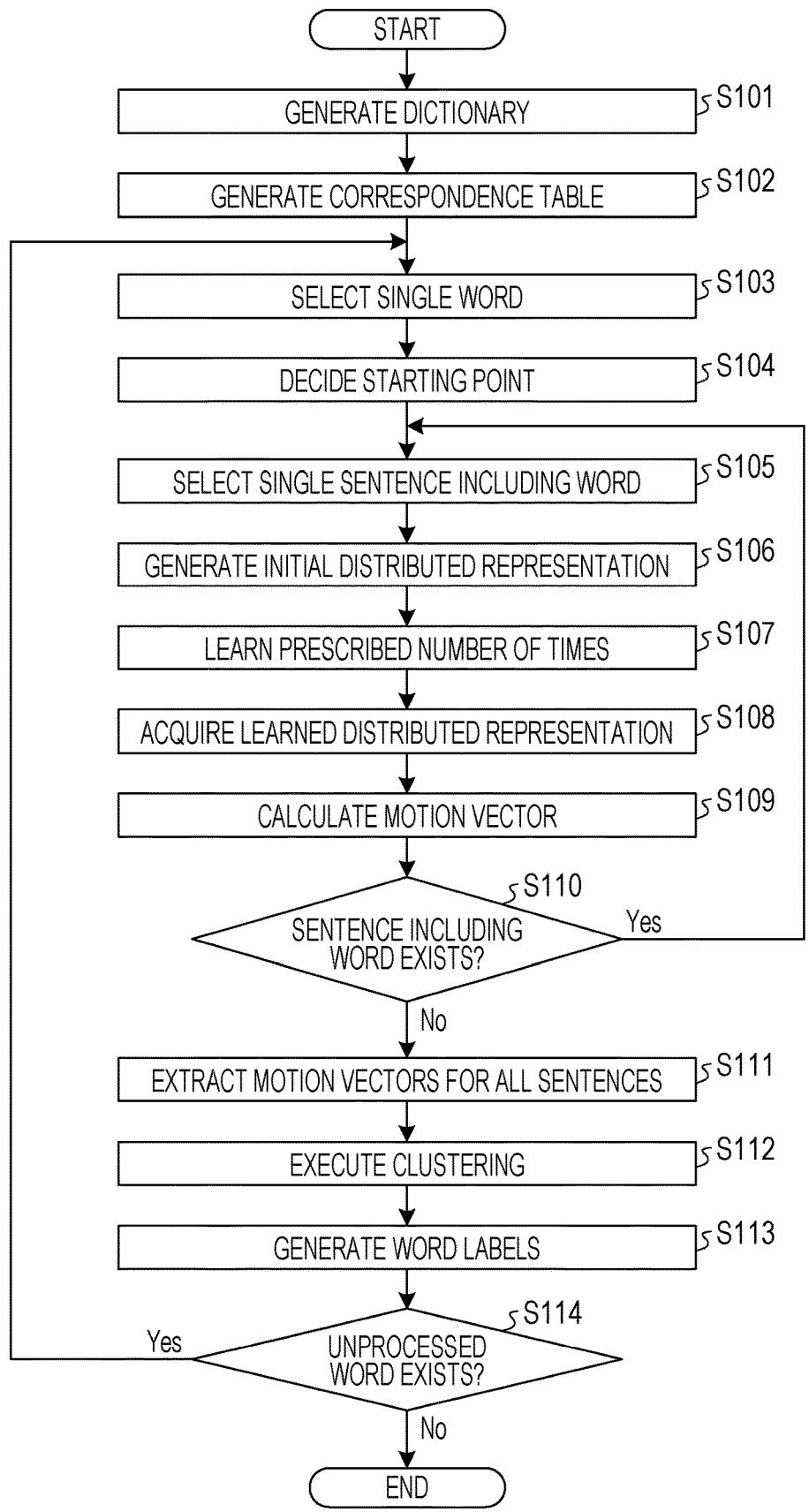
FIG. 9 is a flowchart illustrating a flow of a clustering process.

FIG. 9 is a flowchart illustrating a flow of a clustering process. As illustrated in FIG. 9, the extractor 21 of the clustering device 10 extracts words from each sentence stored in the sentence DB 13 and generates a dictionary of the words (S101) while also generating a list of sentences including each word, that is, a correspondence table (S102).

Next, the starting point decider 22 selects a single word (S103), and decides a starting point using a predetermined technique (S104). After that, the learner 23 selects a sentence including the word selected in S103 (S105), and the starting point decider 22 generates a vector set at the starting point and corresponding weights, and generates an initial distributed representation (S106).

Subsequently, the learner 23 treats the starting point, the y-vector of a Skip-gram generated from the sentence and the x-vector of the Skip-gram generated from the sentence as inputs, executes learning a predetermined number of times using the Skip-gram (S107), and acquires a learned distributed representation (S108).

After that, the motion vector calculator 24 uses the distributed representation before and after learning to compute a motion vector of the word (S109). Subsequently, in the case in which another sentence including the word selected in S103 exists (S110: Yes), the flow repeats from S105.

On the other hand, in the case in which another sentence including the word selected in S103 does not exist (S110: No), the sorter 25 extracts the motion vectors for all sentences including the word selected in S103, that is, each motion vector computed using each sentence (S111), and executes clustering using the distances between each of the motion vectors and the like (S112).

Subsequently, in accordance with the clustering result, the sorter 25 generates and assigns word labels to each sentence, in which the same labels are assigned for the same cluster and different labels are assigned for different clusters (S113).

After that, in the case in which an unprocessed word exists (S114: Yes), the flow repeats from S103, whereas in the case in which an unprocessed word does not exist (S114: No), the clustering process ends.

[Effects]

As described above, the clustering device 10 is able to cluster the motion vectors of a distributed representation over the course of learning a distributed representation of a word using each sentence. Additionally, by clustering the motion vectors for each word and estimating the number of meanings, the clustering device 10 is able to assign a different label to each different meaning of a word with multiple meanings. Consequently, by clustering motion vectors over the course of learning a distributed representation for all words, the clustering device 10 is able to learn semantic representations with high accuracy, and improve the accuracy of distributed representations of words with multiple meanings.

EXAMPLE 2

Although the foregoing describes an example of the present disclosure, the present disclosure may be carried out in various different forms other than the example described above.

[Setting the Starting Point]

Figure 10A:
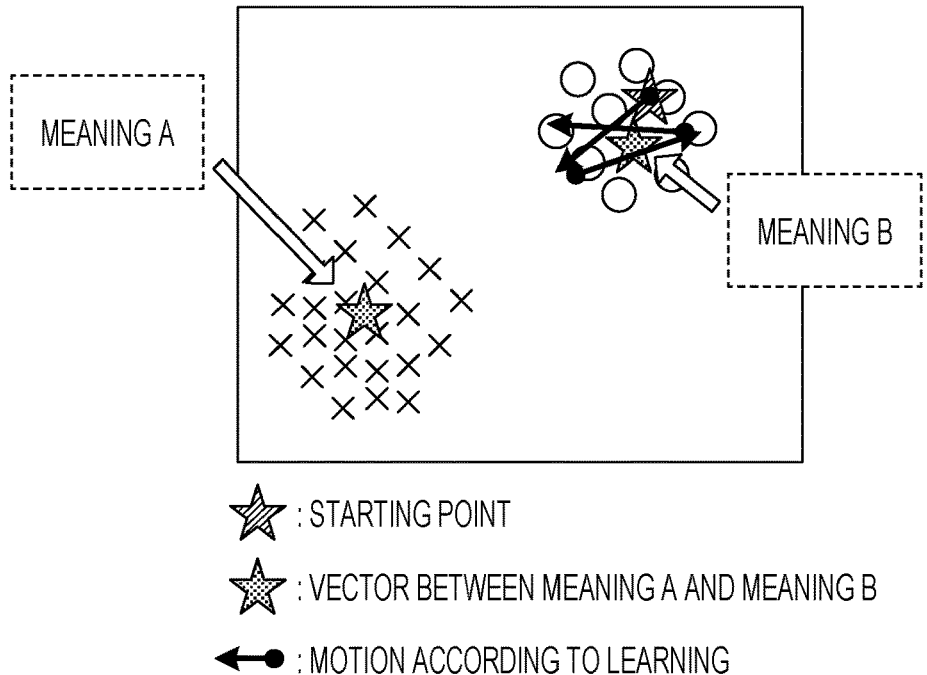
FIGS. 10A and 10B are diagrams explaining accuracy degradation in the case of a single starting point.
Figure 10B:
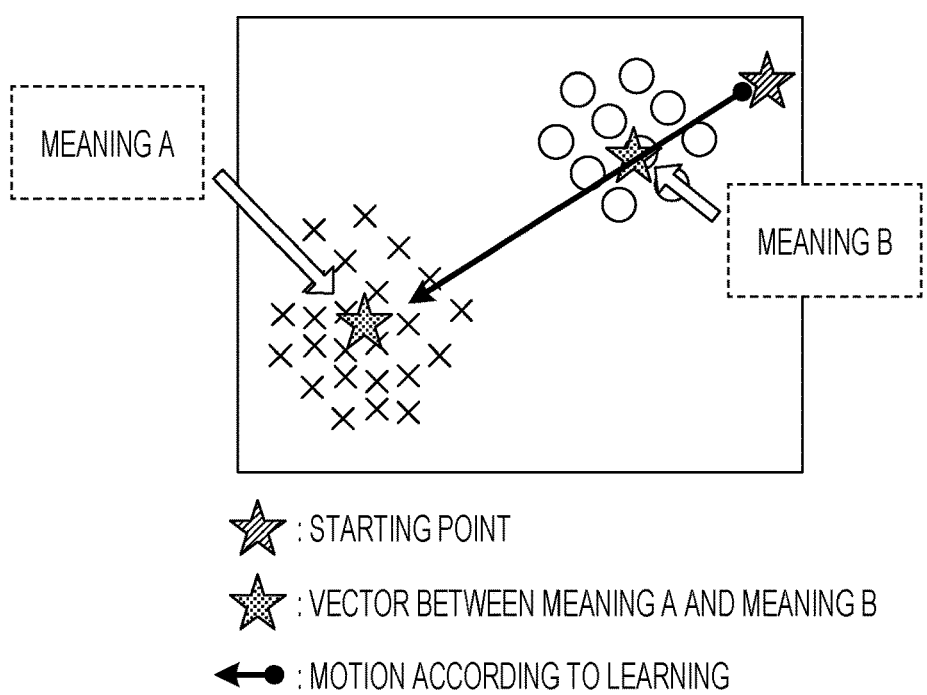

The above example describes using a single randomly-set starting point, but in the case of deciding the starting point randomly, the direction in which to move over the course of learning is unclear, and a lowered clustering accuracy is also conceivable. FIGS. 10A and 10B are diagrams explaining accuracy degradation in the case of a single starting point. If a vector moves to cross over the original vector as illustrated in FIG. 10A over the course of learning, the movement of sentences including the meaning B becomes unclear, and the clustering accuracy is degraded. Also, as illustrated in FIG. 10B, if there are multiple meanings (meaning A, meaning B) of a word being learned, and the starting points of vectors are set on the same side in a straight line, the directions of movement by learning become the same, and each word may no longer be distinguishable.

Accordingly, the clustering device 10 may attempt to improve accuracy by preparing multiple starting points and executing learning using each starting point, and using the results for clustering that is executed correctly. For example, the clustering device 10 prepares multiple randomly set starting points with respect to a single word. Subsequently, the clustering device 10 executes the learning described in Example 1 for each starting point, and computes a motion vector for each starting point.

After that, the clustering device 10 may adopt a single vector for which clustering is successful. In addition, the clustering device 10 is also able to execute clustering using an average value of the motion vectors for each starting point, and is also able to compute an average value using motion vectors other than at the starting points where clustering has failed.

Also, a clustering result may be used to perform additional learning. For example, in the case of FIG. 8B, the word w4 is relearned by being treated as included in the sentences s1, s10, and s103, and in addition, the word w4 is relearned by being treated as included in the sentences s2, s3, s36, and s58. With this arrangement, the meaning of the word s4 may be subdivided. Also, since the meaning of the word w4 may be subdivided, a new clustering for other words used in sentences including the word w4 may be anticipated, and an improvement in the overall clustering accuracy may be anticipated.

[System]

Information may be modified in any way unless specifically noted otherwise, such information including the processing procedures, control procedures, specific names, and various data or parameters indicated in the above document or in the drawings.

Furthermore, the respective structural elements of the respective device illustrated in the drawings are functional and conceptual illustrations, and are not limited to being physically configured exactly as depicted in the drawings. In other words, the specific configuration in which the respective devices are distributed or unified is not limited to that illustrated in the drawings. In other words, all or part thereof may be functionally or physically separated or joined in arbitrary units according to factors such as various loads and usage conditions. Furthermore, all or any part of each processing function executed by each device may be realized by a CPU and a program analytically executed by the CPU, or alternatively, realized as hardware by wired logic.

[Hardware]

Figure 11:
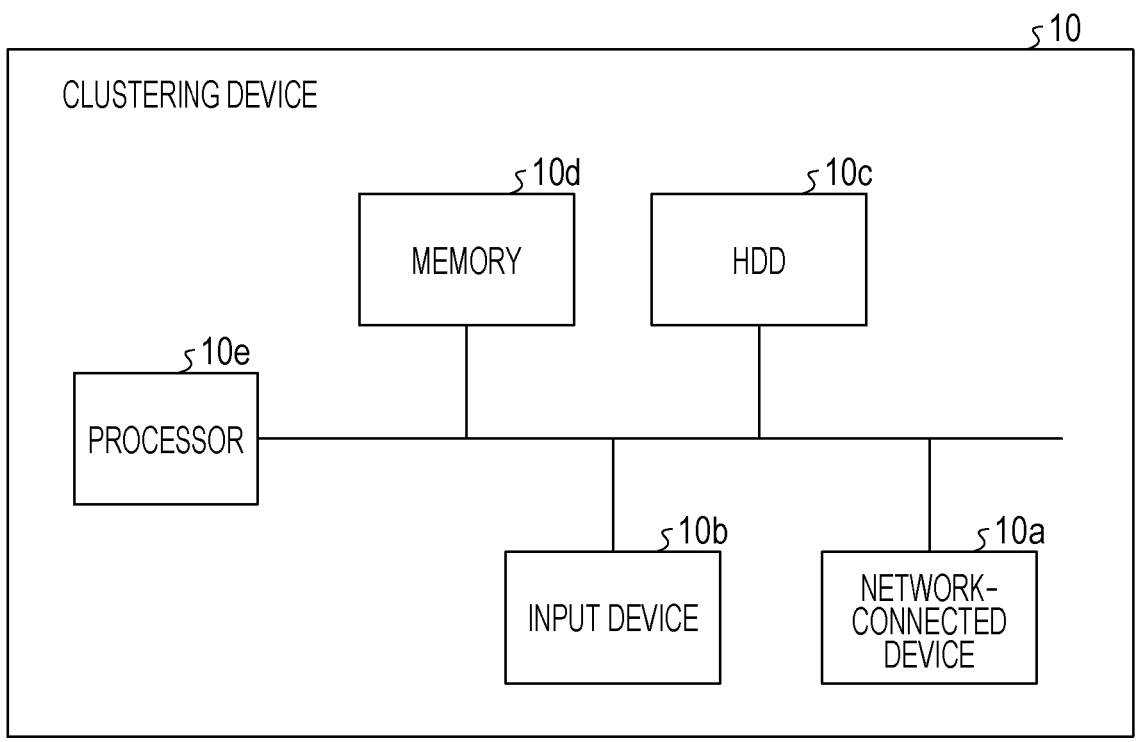
FIG. 11 is a diagram illustrating an exemplary hardware configuration.

FIG. 11 is a diagram illustrating an exemplary hardware configuration. As illustrated in FIG. 11, the clustering device 10 includes a network connection device 10a, an input device 10b, a hard disk drive (HDD) 10c, memory 10d, and a processor 10e. Also, the components illustrated in FIG. 11 are interconnected by a bus or the like.

The network connection device 10a is a network interface card or the like, and communicates with another server. The input device 10b is a mouse, keyboard, and the like, and receives various instructions and the like from a user. The HDD 10c stores programs and DBs by which the functions illustrated in FIG. 3 are made to operate.

The processor 10e reads out from the HDD 10c or the like a program that executes processing similar to each processing unit illustrated in FIG. 3, and loads the program into the memory 10d, thereby running a process that executes each of the functions described in FIG. 3 and the like. In other words, the process executes functions similar to each of the processing units included in the clustering device 10. Specifically, the processor 10e reads out from the HDD 10c or the like a program that includes functions similar to the extractor 21, the starting point decider 22, the learner 23, the motion vector calculator 24, the sorter 25, and the vector generator 26, and the like. Subsequently, the processor 10e executes a process that executes processing similar to the extractor 21, the starting point decider 22, the learner 23, the motion vector calculator 24, the sorter 25, the vector generator 26, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a clustering program for causing a computer to execute a process for generating a distributed representation of a word in a vector space, the process comprising:
   recording, before a learning of multiple words, a first vector value in the vector space for each of the multiple words in at least one sentence retrieved from a sentence storage;
   recording, after the learning, a second vector value in the vector space for each of the multiple words;
   calculating a motion vector based on a difference between the first vector value and the second vector value for each of the multiple words;
   clustering the multiple words based on the calculated motion vector; and
   generating vectors separated for each meaning with respect to a word with multiple meanings included among the multiple words, based on a result of the clustering.

2. The recording medium according to claim 1, wherein the at least one sentence includes multiple sentences, and the process further comprising:
   setting a starting point in the vector space for a word included in multiple sentences;
   treating each of the multiple sentences including the word as input, and acquiring a moved vector that has been moved from the starting point by learning;
   computing a difference between the starting point when inputting each of the multiple sentences and the moved vector as a motion vector; and
   clustering the multiple sentences based on a distance between the motion vectors for each of the multiple sentences.

3. The recording medium according to claim 2, wherein the process further comprising:
   assigning word labels to the word included in clustered sentences, in which a same label is assigned to a same cluster, and different labels are assigned to different clusters.

4. The recording medium according to claim 2, wherein in the setting:
   the starting point is set to a vector selected randomly in the vector space, to a zero vector whose elements are all zero, or to a vector obtained by learning according to a predetermined learning technique.

5. A clustering method, performed by a computer, for generating a distributed representation of a word in a vector space, the method comprising:
- recording, before a learning of multiple words, a first vector value in the vector space for each of the multiple words in at least one sentence retrieved from a sentence storage;
- recording, after the learning, a second vector value in the vector space for each of the multiple words;
- calculating a motion vector based on a difference between the first vector value and the second vector value for each of the multiple words;
- clustering the multiple words based on the calculated motion vector; and
- generating vectors separated for each meaning with respect to a word with multiple meanings included among the multiple words, based on a result of the clustering.

6. A clustering apparatus for generating a distributed representation of a word in a vector space, the apparatus comprising:
- a memory; and
- a processor coupled to the memory and configured to perform a process including:
  - recording, before a learning of multiple words, a first vector value in the vector space for each of the multiple words in at least one sentence retrieved from a sentence storage;
  - recording, after the learning, a second vector value in the vector space for each of the multiple words;
  - calculating a motion vector based on a difference between the first vector value and the second vector value for each of the multiple words;
  - clustering the multiple words based on the calculated motion vector; and
  - generating vectors separated for each meaning with respect to a word with multiple meanings included among the multiple words, based on a result of the clustering.

7. A clustering apparatus for improving accuracy of a distributed representation of words, comprising:
- an extractor unit configured to extract a word from sentences maintained in a sentence storage device and generate a listing of sentences including the word;
- a first recorder unit configured to assign a first vector value in a vector space for the word before a learning of the word;
- a second recorder unit configured to assign, after the learning, a second vector value in the vector space for the word based on a learning model for each of the sentences including the word;
- a motion vector calculation unit configured to compute a motion vector based on a difference between the first vector value and each of the second vector values for each of the sentences including the word;
- a sorter unit configured to cluster the word into one or more clusters based on the computed motion vectors;
- a vector generating unit configured to generate one more vectors, each separated for a different meaning of word, to determine whether the word includes one or more meanings.

* * * * *